United States Patent Office 3,262,014
Patented July 19, 1966

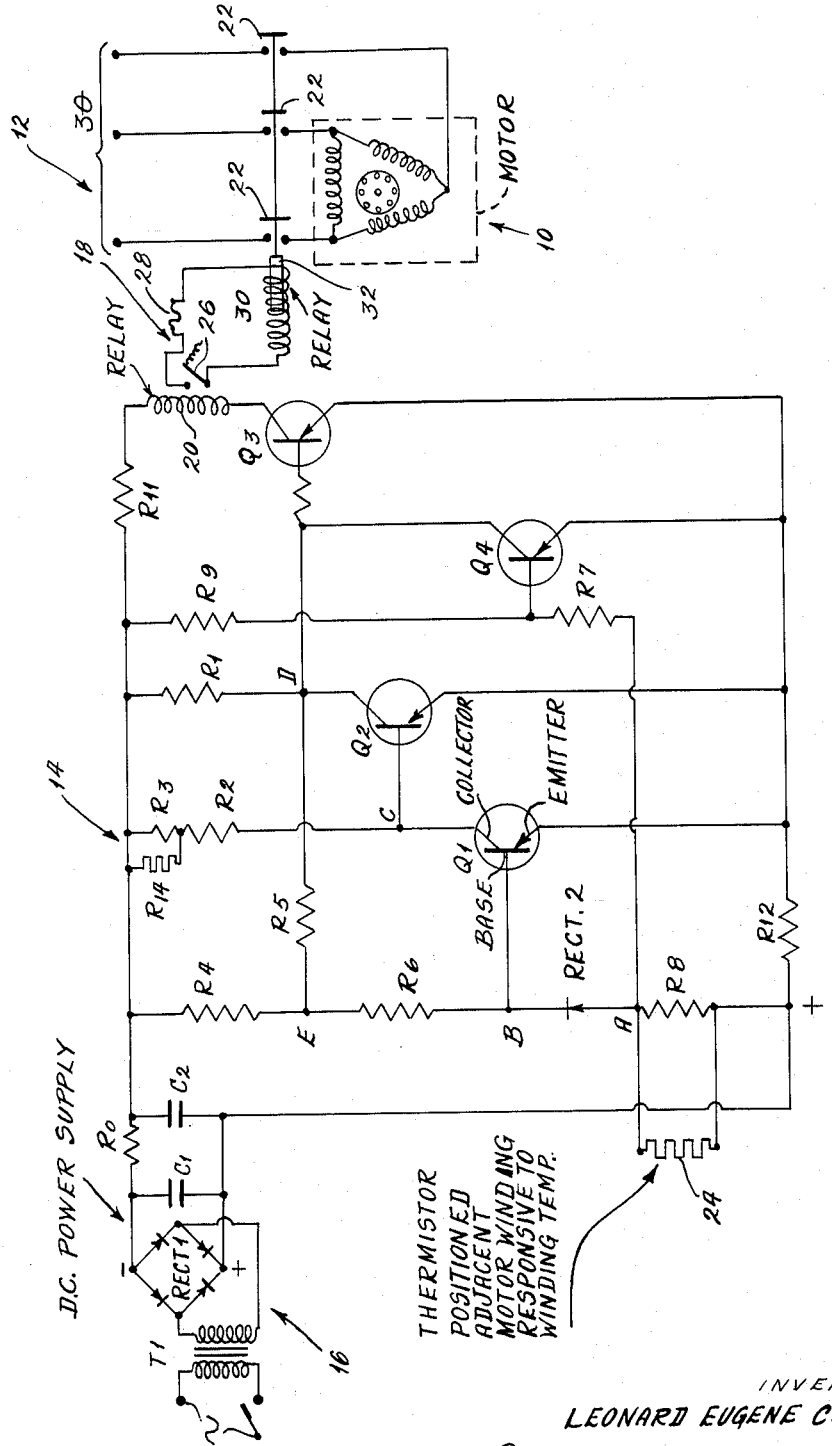

3,262,014
EQUIPMENT PROTECTION MEANS
Leonard Eugene Conner, Overland, Mo., assignor to Wagner Electric Corporation, St. Louis, Mo., a corporation of Delaware
Filed Feb. 5, 1962, Ser. No. 171,038
7 Claims. (Cl. 317—13)

The present invention relates generally to protection devices and the like and more specifically to devices and circuits for protecting dynamo electric machines and other electrical and electronic equipment.

Many protective devices and circuits have been devised and used in the past and some of these have been devised and used to protect dynamo electric machines and other similar equipment. So far as is known, however, no one heretofore has proposed or devised a positive acting, temperature controlled transistorized protective circuit which is also provided with built in safety features that prevent damage in case the protective circuit itself becomes faulty or inoperative or in the event of a power failure. These and other desirable features are incorporated in the present protective circuit which therefore constitutes an improvement and advancement in the art of protective circuitry.

Briefly, the present invention comprises protective means for dynamo electric machines and the like including amplifier circuit means employing positive regenerative feed back, temperature responsive means, and relay means including relay contact means in the circuit of a dynamo electric machine or other device to be protected.

A principal object of the present invention therefore is to provide improved protective means for dynamo electric machines and other electric circuits and devices.

Another object is to control the operating temperature range of dynamo electric machines and the like.

Another object is to protect equipment in the event of power failures and faulty circuit operation.

Another object is to provide positive acting means for energizing and deenergizing relay and other control devices.

Another object is to provide solid state or transistorized protective circuit means for motors, generators and other dynamo electric machines.

Another object is to provide current controlled as distinguished from voltage controlled protective circuit means.

Another object is to provide relatively inexpensive, compace and extremely reliable protective circuit means.

Still another object is to provide relatively trouble free protective circuit means.

These and other objects and advantages of the present invention will become apparent after considering the following detailed specifiction of a preferred embodiment thereof in conjunction with the accompanying drawing wherein a particular preferred form of the invention is shown.

In the drawing, the number 10 refers to a motor or other dynamo electric machine or circuit, number 12 refers to an input power supply for the motor, number 14 refers generally to a protective circuit for the motor 10 constructed according to the present invention, and number 16 refers to a power supply for the circuit 14. For purposes of this specification the circuit 14 will be described in connection with the motor 10 using a relay 18 to control the connection of the motor 10 to its source of power. It is to be understood, however, that devices other than relays can also be used and it is also contemplated to protect devices other than motors.

The circuit 14 is designed and constructed primarily to protect the motor 10 against overheating but it also includes means for protecting it in case of a failure of the protective circuit itself, and also in the event of a failure of either of the power supplies 12 and 16.

The circuit 14 is basically a three stage transistor amplifier circuit connected to have positive or regenerative feed back in order to positively energize and de-energize the relay 18. In addition, the circuit 14 is provided with a thermistor or heat sensitive element 24 in the control circuit of one of the transistor amplifiers for temperature compensation or temperature control of the motor. The circuit 14 also employs a transistor circuit to shunt one of the amplifier stages under certain conditions. The shunt transistor circuit is provided as an added safety feature to cause the relay 18 to open in the event the thermistor 24 breaks or becomes open.

The various electric components which make up the circuit 14 are identified in the drawing by alphabetical symbols having subscripts. The letter R, for example, denotes to a resistor, the letter C a capacitor, the letter T a transformer, the letter Q a transistor, and the expression RECT refers to a rectifier. Subscripts are included to identify specific elements.

A source of input voltage for the circuit 14 is connected to the primary side of input transformer $T_1$, and the output of the transformer $T_1$ is connected to the terminals a full wave rectifier $RECT_1$. The output of the rectifier is filtered by a filter circuit which includes capacitors $C_1$ and $C_2$ and resistor $R_0$.

Under normal operating conditions with the motor temperature within its design limitations the thermistor 24 has a relatively high impedance or resistance. Under these conditions the voltage between the base and emitter of the first stage transistor $Q_1$ is relatively high thereby making the impedance between the emitter and the collector of the transistor $Q_1$ relatively low. This in turn means that the voltage between the base and emitter of the second stage transistor $Q_2$ is relatively low, and consequently the impedance between the emitter and the collector of the second stage transistor $Q_2$ is relatively high. In like manner this means that the voltage between the base and the emitter of the third stage transistor $Q_3$ is relatively high and that the impedance between the emitter and collector of the third stage transistor $Q_3$ is low. With low impedance between the emitter and collector of the third stage transistor $Q_3$ the energizing coil 20 of the relay 18 which is connected in this circuit will be energized and its contacts 26 will close. The closing of contacts 26 will energize another circuit including another relay coil 30 which has contacts 22 in the supply circuit 12 of the motor 10. At this time the impedance between the emitter and collector of the shunting transistor $Q_4$ is relatively high and therefore transistor $Q_4$ has little or no effect under normal circuit operation.

As long as the temperature of the motor remains within its design limitations as determined by the impedance or resistance of the thermistor 24, the motor will continue to operate and the circuit 14 will remain in the energized condition described above.

However, if the temperature of the motor should rise to an abnormally high temperature, the impedance or resistance of the thermistor 24 will decrease to a correspondingly relatively low value, and this will cause the voltage between the base and the emitter of the first stage transistor $Q_1$ to be relatively low. This, in turn, will cause the impedance between the emitter and the collector of $Q_1$ to become relatively high and will cause the voltage between the base and emitter of the second stage transistor $Q_2$ to be relatively high with a resulting low impedance between its emitter and collector. By the same token the voltage between the base and emitter of the third stage transistor $Q_3$ will now become relatively low and the impedance between the emitter and collector of the third stage transistor $Q_3$ will therefore become high and deenergize the relay 18. With the relay 18 deenergized its contacts 26 open and disconnect the motor 10 from its source of power 12. In this condition of the circuit, the impedance between the emitter and collector of the shunting transistor $Q_4$ remains relatively high and therefore still has no affect upon the circuit operation.

It is now apparent that the impedance or resistance of the thermistor 24 controls the energizing and deenergizing of the relay 18, and hence also controls the energizing and deenergizing of the motor 10.

The circuit 14 is also provided with a positive feed back circuit connected between the first and second stage transistors $Q_1$ and $Q_2$. The positive feed back is provided in order to obtain extremely fast and positive switching action of the relay between its energized and deenergized positions.

Without providing positive feedback in the circuit 14, the circuit would act as a three stage amplifier to energize and deenergize the relay in response to predetermined changes in the impedance or resistance of the thermistor 24 as described above. For example, in an actual circuit a thermistor resistance of approximately 10,000 ohms was selected for normal operating conditions including normal motor temperature. As the motor 10 heated up the resistance of the thermistor 24 dropped until at approximately 600 ohms which corresponded to a motor temperature of approximately 100 degrees centigrade the condition of the circuit changed and deenergized the relay 18. For some purposes this sort of operation may be adequate. However, in certain other situations operation simply as a three stage amplifier without feed back is objectionable because of the fact that the circuit is more sensitive and is apt to be affected by minor disturbances such as line disturbances, shock and vibration and also by changes in the characteristics of the circuit elements themselves, all of which can cause the relay to drop in too early or too late. Also if the output of the D.C. power supply 16 has a ripple this may cause the relay to vibrate or chatter.

To overcome these undesirable and unstable conditions, means have been included in the circuit 14 to provide positive feed back. The positive feed back is obtained by connecting the collector of the second stage transistor $Q_2$ to a resistor $R_5$ which has its opposite end connected to a circuit point labeled E in the circuit of the first stage transistor $Q_1$. With this connection, when a change in the output of the first stage transistor $Q_1$ causes a change in the output of the second stage transistor $Q_2$ as described above, part of that output current of the second stage transistor $Q_2$ flows through the resistor $R_5$ and also through another resistor $R_4$. This current causes a change in the potential of the point E and also of a point B which is connected to the base of the transistor $Q_1$. This in turn affects the output of the transistor $Q_1$ and hence also affects the output of the transistor $Q_2$. This means that if the impedance of the thermistor 24 decreases to a relatively low value in response to a high motor temperature, the voltage between the base and emitter of the transistor $Q_1$ will also be decreased by the feed back effect, and this in turn will further increase the impedance between the emitter and collector of the transistor $Q_1$. The effect of this increased impedance is to increase the base to emitter voltage of the second stage transistor $Q_2$, and this will have the further effect of increasing the output current of the second stage transistor $Q_2$ and hence the current flowing in the resistors $R_4$ and $R_5$ to still further decrease the voltage between the base and the emitter of the first stage transistor $Q_1$. The feed back then has a cumulative or regenerative effect which is added to the effect produced by changes in the resistance of the thermistor 24. This cumulative effect also affects the operation of the third stage transistor $Q_3$ to produce positive action of the relay 18.

As already noted, another transistor $Q_4$ is provided to cause the relay 18 to open in the event that the thermistor 24 should break or otherwise open. The base of the transistor $Q_4$ is connected to one end of resistors $R_7$ and $R_9$. The opposite end of the resistor $R_7$ is connected to circuit point A which is common to one end of the thermistor 24, to one end of a resistor $R_8$ and to one side of a rectifier RECT 2. The opposite end of the resistor $R_9$ is connected to the negative side of the output of the D.C. power supply 16. The opposite side of the rectifier RECT 2 from the point A is connected to the base of the first stage transistor $Q_1$ and also to one side of a resistor $R_6$. With the circuit of transistor $Q_4$ connected as described, the transistor $Q_4$ has a normally relatively high emitter to collector impedance and therefore plays no part in the normal operation of the circuit. However, if the thermistor 24 should open up, then the base of transistor $Q_4$ will go sufficiently negative to cause the circuit point D connected to the collector of transistor $Q_4$ to become relatively more positive. This in turn will increase the emitter to collector impedance of the third stage transistor $Q_3$ and deenergizes the relay 18. Without the rectifier RECT 2 in the circuit the maximum potential difference between the emitter and base of transistor $Q_4$ would be substantially limited to the drop across the emitter to base of the first stage transistor $Q_1$ when the thermistor 24 opens. However, with the rectifier RECT 2 in the circuit the base of transistor $Q_4$ can go sufficiently negative to cause D to go positive thus causing the third stage transistor $Q_3$ to have high impedance between its emitter and collector thereby deenergizing the relay 18.

A temperature compensation circuit which includes resistors $R_2$ and $R_3$ and another thermistor $R_{14}$ is also included in circuit 14. This compensation circuit is connected between the negative side of the D.C. power source 16 and circuit point C which is connected to the collector of transistor $Q_1$ and to the base of transistor $Q_2$. The temperature compensation circuit causes the point C to remain at approximately the same potential for a given signal over a varying ambient temperature range. The thermistor $R_{14}$ in the particular circuit described above is also a 10,000-ohm thermistor and is provided to change the load resistance of the first stage transistor $Q_1$ with the changes in ambient temperature. For example, the resistance of the combination of $R_2$, $R_3$ and $R_{14}$ in the actual circuit described above was selected to be around 6375 ohms at an operating temperature of approximately 20 degrees centigrade, and dropped in a substantially straight line relationship with increasing temperature until at a temperature of approximately 40 degrees centigrade the combined resistance was about 3625 ohms.

In the above described circuit the thermistors were constructed to have approximately 600 ohms at a motor temperature of approximately 100 degrees centigrade, and the relay opened when the thermistor 24 reached that temperature. In the same circuit the relay was reenergized when the thermistor 24 had cooled to approximately 65 degrees centigrade. The motor therefore never operated above 100 degrees centigrade and always operated below 65 degrees centigrade. Obviously these particular values are mentioned for illustrative purposes only and are in no way intended to limit the present invention.

In the drawing, the relay 18 is shown as having a coil 20 in the output circuit of the third stage transistor $Q_3$. The coil 30 as already indicated is connected in a series circuit which is energized by the closing of the relay contacts 26 under control of the coil 20. The series circuit includes a source of energy 28 and the relay coil 30 which is energized by the source 28 when the contacts 26 are closed. The second relay coil 30 operates an armature member 32 which is connected to the transfer contacts 22 in the power circuit of the motor 10. Other relay devices or circuits could also be used without changing the basic operating principles of the invention and as such are contemplated as being within the scope of the invention.

Thus there has been shown and described novel protective circuit means for dynamo electric machines and other devices and circuits which fulfill all of the objects and advantages sought therefor. Briefly, the subject circuit means comprises a multi-stage amplifier circuit, a variable impedance element for controlling said circuit, said element being connected to one of said amplifier circuit stages and responding to changes of a predetermined condition to produce impedance changes thereof, a control member connected to one of said stages and being energized and deenergized in response to predetermined changes of the impedance of said variable impedance element, and regenerative feed back means connected between at least two of the amplifier circuit stages. The subject circut means may also include current controlled elements and temperature responsive compensating circuit means.

The present specification and drawing have been presented to illustrate a particular form of protective circuit in conjunction with a particular device to be controlled and protected. It is contemplated however, that many changes, modifications, and variations of the particular disclosed device will become apparent to those skilled in the art after considering this specification and the accompanying drawing. All such changes, modifications and variations which do not depart from the spirit and scope of the invention are deemed to be covered by the invention which is limited only by the claims which follow.

What is claimed is:

1. A condition responsive circuit for controlling the the energization and de-energization of an electrical device in response to predetermined changes in a preselected condition comprising a pair of transistor amplifier stages each having input and output circuits, condition sensing means responsive to said condition coupled in the input circuit of one of said stages to control the output thereof in response to changes in said condition, means coupling the input circuit of the other of said stages to the output circuit of said one stage to control the output thereof in response to the output of said one stage, feedback circuit means coupled between the output circuit of said other stage and the input circuit of said one stage to provide positive feedback between said stages, circuit means responsive to the output of said other stage connected to said electric device to effect operation of said electric device in response to the output of said other stage, and another transistor amplifier stage having an input circuit and an output circuit, the input circuit of said another stage being coupled to said sensing means, the output of said another stage being coupled to said circuit means and being responsive to a predetermined condition of said sensing means to effect de-energization of said electric device upon the occurrence of said predetermined condition of said sensing means independently of said other stage.

2. A condition responsive circuit for controlling the operation of an electrical device in response to a predetermined change in a preselected condition comprising first, second, third and fourth amplifier stages each having input and output circuits, condition sensing means responsive to said predetermined changes in said condition coupled in the input circuit of said first stage to control the output thereof in response to a predetermined change in said condition, means coupling the input circuit of said second stage to the output circuit of said first stage to control the output of said second stage in response to the output of said first stage, circuit means coupled between the output circuit of said second stage and the input circuit of said first stage to provide positive feedback between said first and second stages, means coupling the input circuit of said third stage to the output circuit of said second stage to control the output of said third stage in response to the output of said second stage, and means coupling said electric device to the output of said third stage to control the operation of said electric device in response to said predetermined change, the input circuit of said fourth stage being coupled to said sensing means to control the output thereof in response to a predetermined condition of said sensing means, the input circuit of said third stage being also coupled to the output circuit of said fourth stage to effect operation of said electric device in response to said predetermined condition of said sensing means.

3. A condition responsive circuit for controlling the operation of an electrical device in response to predetermined changes in a preselected condition comprising first, second, third and fourth transistor amplifier stages each having input and output circuits, condition sensing means including a variable impedance device responsive to said predetermined changes in said condition coupled in the input circuit of said first stage to control the output thereof in response to said predetermined changes, means coupling the input circuit of said second stage to the output circuit of said first stage to control the output of said second stage in response to the output of said first stage, feedback circuit means coupled between the output circuit of said second stage and the input circuit of said first stage to provide positive feedback between said first and second stages, means coupling the input circuit of said third stage to the output circuit of said second stage to control the output of said third stage in response to the output of said second stage, means coupling said electric device to the output of said third stage to control the operation of said electric device in response to said predetermined changes, the input circuit of said fourth stage being coupled to said sensing means to control the output thereof in response to a predetermined condition of said sensing means, the output circuit of said fourth stage being coupled to the input circuit of said third stage to effect operation of said electric device upon the occurrence of said predetermined condition of said sensing means independently of the output of said second stage.

4. A protective circuit for an electric device connectable with a power supply source comprising means including relay means for connecting and disconnecting the supply source and the device, a condition sensing element positioned to respond to a variable condition of the device, first, second, third and fourth transistor amplifier stages each having input and output circuits, the input circuit of said first stage being connected to said sensing element to control the output of said first stage, the input circuit of said second stage being coupled to the output circuit of said first stage to control the output of said second stage in response to the output of said first stage, feedback circuit means connected between the output circuit of said second stage and the input circuit of said first stage to provide positive feedback between said first and second stages, the input circuit of said third stage being coupled to the output circuit of said second stage to control the output of said third stage in response to the output of said second stage, the output circuit of said third stage being coupled to said relay for energizing said relay means in response to the output of said third stage, said amplifier stages being responsive to said sensing means to maintain said third stage conductive and said relay energized to thereby maintain said supply source connected with said device when said variable condition is below a predetermined value, and to effect nonconduction of said third stage and de-energization of said relay to disconnect said supply source from said device when said variable condition exceeds a predetermined value, said fourth stage having its input circuit coupled to said sensing means and being responsive to a preselected condition of said sensing element, the output circuit of said fourth stage being connected in a circuit in parallel with the input circuit of said third stage to effect non-conduction of said third stage and de-energize said relay to thereby disconnect said supply source from said device in response to said preselected condition of said sensing means.

5. A protective circuit for an electric device connectable with a power supply source comprising means including relay means for connecting and disconnecting the supply source and the device, a heat responsive element positioned to respond to the temperature of the device, first, second, third and fourth transistor amplifier stages each having input and output circuits, the input circuit of said first stage being connected to said heat responsive element to control the output of said first stage, the input circuit of said second stage being coupled to the output circuit of said first stage to control the output of said second stage in response to the output of said first stage, feedback circuit means connected between the output circuit of said second stage and the input circuit of said first stage to provide positive feedback between said first and second stages, the input circuit of said third stage being coupled to the output circuit of said second stage to control the output of said third stage in response to the output of said second stage, the output circuit of said third stage being coupled to said relay for controlling said relay means in response to the output of said third stage, said amplifier stages being responsive to said heat responsive element to control said relay means so as to maintain said supply source connected with said device when the temperature of said device is below a predetermined value and to disconnect said supply source from said device when said temperature exceeds a predetermined value, said fourth stage having its input circuit coupled to said heat responsive element and being responsive to a preselected condition of said heat responsive element, the output circuit of said fourth stage being connected to the input circuit of said third stage to control the output of said third stage and said relay so as to disconnect said supply source from said device in response to said preselected condition of said heat responsive element.

6. A protective circuit for an electrodynamic machine comprising a power supply source, relay means having switch contacts connected between said source and said machine, and a temperature responsive control circuit for energizing and de-energizing said relay means for respectively connecting and disconnecting the supply source and machine in response to predetermined changes in the temperature of the machine comprising a temperature responsive variable impedance device positioned to respond to the temperature of the machine, first, second, third, and fourth transistor stages each including a transistor having base, emitter and collector electrodes, a D.C. power supply source for energizing said stages, each of said stages having an output circuit including its associated emitter and collector electrodes connected in circuit with said D.C. source and an input circuit including its base electrode and one of its other electrodes, the input circuit of said first stage being coupled to said impedance device to normally effect conduction of said first stage transistor when the temperature of said device is below a predetermined value and to effect nonconduction thereof when the temperature of said device exceeds said predetermined value, the input circuit of said second stage being coupled to the output circuit of said first stage to normally effect non-conduction of said second stage when said first stage is conductive and effect condition thereof when said first stage is non-conductive, circuit means connected between one output electrode of said second stage and the input circuit of said first stage to provide positive feedback between said first and second stages, means connecting said relay in series relation with the emitter and collector electrodes in the output circuit of said third stage, the input circuit of said third stage being coupled to the output circuit of said second stage to normally effect conduction of said third stage when said second stage is non-conductive to energize said relay and to effect non-conduction of said third stage when said second stage is conductive to de-energize said relay, the output circuit of said fourth stage being connected in parallel with the input circuit of said third stage, the input circuit of said fourth stage being connected to said variable impedance device to normally effect non-conduction of said fourth stage but to effect conduction of said fourth stage and non-conduction of said third stage and de-energization of said relay upon an occurrence of an opening in the circuit including the variable impedance device.

7. A protective circuit for an electrical device energizable from a power supply source comprising relay means having contacts connected between the power supply source and the device and relay winding means for closing said contacts when energized to connect said device with said supply source and to open said contacts when de-energized to disconnect the device from said supply source, a temperature responsive impedance element disposed in heat transfer relationship with said device, and a temperature responsive control circuit for controlling the energization and de-energization of said relay winding means in response to the temperature of said device comprising "first, second, third and fourth transistor amplifier stages each including a transistor having base, emitter and collector electrodes, a D.C. power supply source," a pair of resistors connected in series between one side of said D.C. source and the base electrode of said first stage, a rectifier connected in series with said impedance element between said base electrode of said first stage and the other side of said source, a load resistor connected in series with the collector and emitter electrodes of said first stage across said D.C. source, the base electrode of said second stage being connected to the collector electrode of said first stage, another load resistor connected in series with the collector and emitter electrodes of said second stage across said D. C. source, feedback circuit means including resistance means connected between the collector electrode of said second stage and a circuit point between said pair of resistors to provide positive feedback between said first and second stages, the base electrode of said third stage being connected to the collector electrode of said second stage, said relay winding means being connected in series with the collector and emitter electrodes of said third stage and said D.C. source, said first stage normally being conductive when the temperature of said electrical device is below a predetermined value to maintain said second stage nonconductive and said third stage conductive to thereby normally maintain said relay energized, said impedance element being responsive to the temperature of said device to effect nonconduction of said first stage, conduction of said second stage, and nonconduction of said third stage to de-energize said relay when the temperature of said electric device exceeds a predetermined value, means connecting the collector and emitter electrodes of said fourth stage respectively to the base and emitter electrodes of said third stage, and means connecting the base of said fourth stage to a circuit point between said rectifier and said impedance element so that said fourth stage is normally nonconductive but becomes conductive to effect nonconduction of said third stage and de-energization of said relay upon the occurrence of a preselected condition in the circuit including the impedance element.

References Cited by the Examiner

UNITED STATES PATENTS

| | | | |
|---|---|---|---|
| 2,547,011 | 4/1931 | Jacobsen | 330—112 X |
| 2,915,628 | 12/1959 | Newbold | 330—112 |
| 2,956,179 | 10/1960 | Yraquir | 307—88.5 |
| 3,032,690 | 5/1962 | Elliott | 317—41 |
| 3,071,718 | 1/1963 | Gordon | 317—41 |
| 3,164,755 | 1/1965 | Holt et al. | 317—148.5 X |
| 3,188,617 | 6/1965 | Jones et al. | 340—213 |

MILTON O. HIRSHFIELD, *Primary Examiner.*

SAMUEL BERNSTEIN, *Examiner.*

STEPHEN W. CAPELLI, J. D. TRAMMELL,
*Assistant Examiners.*